US011049100B1

United States Patent
Miranda et al.

(10) Patent No.: US 11,049,100 B1
(45) Date of Patent: Jun. 29, 2021

(54) SYSTEM AND METHOD FOR REMOTELY LOADING A CONSUMER PROFILE TO A FINANCIAL TRANSACTION MACHINE

(71) Applicant: JPMorgan Chase Bank, N.A., New York, NY (US)

(72) Inventors: Giancarlo Miranda, Columbus, OH (US); Emma Donaho, Columbus, OH (US); Ronald Gedrich, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 417 days.

(21) Appl. No.: 14/978,746

(22) Filed: Dec. 22, 2015

Related U.S. Application Data

(60) Provisional application No. 62/098,099, filed on Dec. 30, 2014.

(51) Int. Cl.
  *G06Q 20/38* (2012.01)
  *G06Q 20/10* (2012.01)
  *G06Q 20/40* (2012.01)

(52) U.S. Cl.
  CPC ....... *G06Q 20/385* (2013.01); *G06Q 20/1085* (2013.01); *G06Q 20/4014* (2013.01)

(58) Field of Classification Search
  CPC ............. G06Q 20/385; G06Q 20/1085; G06Q 20/4014; G06Q 20/38; G06Q 20/10; G06Q 20/40
  See application file for complete search history.

(56) References Cited

U.S. PATENT DOCUMENTS

| 3,876,864 | A | * | 4/1975 | Clark | G07F 19/20 235/379 |
| 4,617,457 | A | * | 10/1986 | Granzow | A47F 9/00 235/379 |
| 5,970,888 | A | * | 10/1999 | Sheppard | E05G 7/008 109/10 |
| 6,045,039 | A | * | 4/2000 | Stinson | G06Q 20/18 235/379 |
| 6,149,056 | A | * | 11/2000 | Stinson | G06Q 20/1085 235/379 |

(Continued)

OTHER PUBLICATIONS

Networld Media Group, "2014 ATM Software Trends & Analysis," Jul. 2014, 7th Ed, pp. 1-61. (Year: 2014).*

*Primary Examiner* — Kenneth Bartley
(74) *Attorney, Agent, or Firm* — Hunton Andrews Kurth LLP

(57) ABSTRACT

Methods, systems, and computer-readable media for loading a customer profile to an electronic banking kiosk are disclosed. A customer who is without a physical form of authentication, such as a debit card, may access his or her customer profile on the electronic banking kiosk after being authenticated with a teller. The teller may receive identification information from the customer and exchange data with an account server to authenticate the customer. The account server may thereafter push the customer's profile to an electronic banking kiosk and provide a code to the customer. The customer may use the code to access his or her customer profile that has been pushed to the electronic banking kiosk, even without having a physical form of authentication recognized by the electronic banking kiosk.

7 Claims, 15 Drawing Sheets

(56) References Cited

U.S. PATENT DOCUMENTS

| | | | | |
|---|---|---|---|---|
| 6,286,756 B1* | 9/2001 | Stinson | G06Q 20/18 | 235/379 |
| 6,497,362 B2* | 12/2002 | Persky | G06Q 30/02 | 235/379 |
| 7,464,860 B2* | 12/2008 | Militello | G07F 19/20 | 235/379 |
| 7,490,761 B2* | 2/2009 | Taylor | G07F 19/20 | 235/379 |
| 8,181,854 B1* | 5/2012 | Folk | G06Q 30/0267 | 235/379 |
| 8,640,946 B1* | 2/2014 | Block | G06Q 20/1085 | 235/379 |
| 8,651,373 B1* | 2/2014 | Block | G06Q 20/1085 | 235/379 |
| 8,856,893 B2* | 10/2014 | Min | H04L 9/3271 | 726/5 |
| 8,955,743 B1* | 2/2015 | Block | G07F 19/201 | 235/379 |
| 9,004,353 B1* | 4/2015 | Block | G06Q 20/1085 | 235/379 |
| 9,098,961 B1* | 8/2015 | Block | G07F 19/201 | |
| 9,141,876 B1* | 9/2015 | Jones | G06K 9/60 | |
| 9,355,530 B1* | 5/2016 | Block | G07F 19/201 | |
| 9,824,545 B2* | 11/2017 | Smith | G07F 19/20 | |
| 9,886,688 B2* | 2/2018 | Weiner | G06Q 20/3829 | |
| 9,886,693 B2* | 2/2018 | Song | G06Q 20/405 | |
| 10,475,296 B1* | 11/2019 | Soprano-Joseph | G06Q 20/206 | |
| 2002/0082994 A1* | 6/2002 | Herziger | G07F 19/20 | 705/43 |
| 2002/0148896 A1* | 10/2002 | Persky | G06Q 30/02 | 235/383 |
| 2004/0124966 A1* | 7/2004 | Forrest | G07F 7/08 | 340/5.8 |
| 2007/0124597 A1* | 5/2007 | Bedingfield, Sr. | G06F 21/31 | 713/186 |
| 2007/0145114 A1* | 6/2007 | Militello | G07F 19/20 | 235/379 |
| 2007/0145115 A1* | 6/2007 | Savage | G06Q 20/1085 | 235/379 |
| 2007/0235523 A1* | 10/2007 | Clements | G06Q 20/06 | 235/379 |
| 2008/0046333 A1* | 2/2008 | Kawakita | G06Q 10/0637 | 705/7.36 |
| 2008/0093441 A1* | 4/2008 | Taylor | G07F 19/20 | 235/379 |
| 2008/0097883 A1* | 4/2008 | Savage | G06Q 40/00 | 705/35 |
| 2008/0186377 A1* | 8/2008 | Eriksson | H04N 7/152 | 348/14.01 |
| 2008/0249947 A1* | 10/2008 | Potter | G06F 21/31 | 705/67 |
| 2009/0070860 A1* | 3/2009 | Hirata | G06F 21/32 | 726/5 |
| 2009/0320106 A1* | 12/2009 | Jones | G06Q 20/206 | 726/5 |
| 2009/0328052 A1* | 12/2009 | Nguyen | G07F 19/20 | 718/104 |
| 2010/0049659 A1* | 2/2010 | Cassone | G06F 21/32 | 705/64 |
| 2010/0250364 A1* | 9/2010 | Song | G06F 21/33 | 705/14.47 |
| 2011/0270744 A1* | 11/2011 | Baker | G06Q 20/04 | 705/39 |
| 2012/0233657 A1* | 9/2012 | Guevin | H04L 63/10 | 726/1 |
| 2012/0314862 A1* | 12/2012 | Min | G06Q 20/385 | 380/255 |
| 2012/0323621 A1* | 12/2012 | Carlegren | G06Q 10/00 | 705/7.13 |
| 2013/0311562 A1* | 11/2013 | platt | H04L 65/403 | 709/204 |
| 2014/0006451 A1* | 1/2014 | Mullis | G06Q 20/18 | 707/784 |
| 2014/0081858 A1* | 3/2014 | Block | G07F 19/207 | 705/43 |
| 2014/0108249 A1* | 4/2014 | Kulpati | G06Q 20/3223 | 705/44 |
| 2014/0214688 A1* | 7/2014 | Weiner | G06F 21/35 | 705/71 |
| 2014/0230032 A1* | 8/2014 | Duncan | G06F 21/32 | 726/7 |
| 2014/0230033 A1* | 8/2014 | Duncan | G06F 21/32 | 726/7 |
| 2014/0263618 A1* | 9/2014 | McCarthy | G06Q 40/02 | 235/379 |
| 2015/0149345 A1* | 5/2015 | Nayler | G07F 19/209 | 705/39 |
| 2015/0170239 A1* | 6/2015 | Hamilton | G06Q 30/0613 | 705/26.41 |
| 2015/0178803 A1* | 6/2015 | Joy | G06Q 30/0613 | 705/26.41 |
| 2015/0237207 A1* | 8/2015 | Ordille | G06F 21/45 | 379/204.01 |
| 2015/0278895 A1* | 10/2015 | Joy | G06Q 30/0613 | 705/21 |
| 2015/0288687 A1* | 10/2015 | Heshmati | G07C 9/257 | 726/7 |
| 2015/0317639 A1* | 11/2015 | Ward | G06Q 30/016 | 705/304 |
| 2016/0019510 A1* | 1/2016 | Guntupalli | G06Q 20/3274 | 705/43 |
| 2016/0063481 A1* | 3/2016 | Gupta | G06Q 20/3229 | 705/72 |
| 2016/0078528 A1* | 3/2016 | Pradeep | G06Q 20/10 | 705/39 |
| 2016/0098692 A1* | 4/2016 | Johnson | G06Q 20/389 | 705/43 |
| 2016/0098700 A1* | 4/2016 | Johnson | G06Q 20/3278 | 705/43 |
| 2016/0098709 A1* | 4/2016 | Johnson | G07F 9/001 | 705/43 |
| 2016/0098904 A1* | 4/2016 | Choudhury | G07F 19/203 | 705/43 |
| 2016/0212125 A1* | 7/2016 | Pender | G06Q 20/1085 | |

* cited by examiner

SYSTEM AND METHOD FOR REMOTELY LOADING A CONSUMER PROFILE TO A FINANCIAL TRANSACTION MACHINE

CROSS-REFERENCE TO RELATED PATENT APPLICATION

This patent application claims priority to U.S. Provisional Application Ser. No. 62/098,099, filed Dec. 30, 2014, which is incorporated herein by reference in its entirety.

FIELD OF THE INVENTION

The present disclosure generally relates to remotely loading a customer profile onto a financial transaction machine to enable a customer to access his/her account(s) on the express banking kiosk based on alternative authentication methods.

BACKGROUND

Financial institution customers often use financial transaction machines, such as express banking kiosks ("EBKs") or automated teller machines ("ATMs"), to perform certain financial institution transactions. Financial institutions have an interest in having customers use these machines instead of using tellers, to perform transactions involving one or more of the customer's accounts because transaction costs are imposed each time a customer uses a teller. Migrating as many transactions as possible from the teller line to financial transaction machines reduces these transaction costs and provides added convenience to customers.

Financial transaction machines typically require debit cards to authenticate a customer. For one reason or another, a customer may not have a required form of authentication, such as a debit card, to use to authenticate him/herself at the machine. Approximately 20% of customers who visit a financial institution to perform a financial transaction do not have their debit card, and hence are unable to use a financial transaction machine to perform the financial transaction, and must rely on a teller to perform the financial transaction for them. This creates long lines at the financial institutions as customers wait for a "teller window" to be open so that they can perform their desired financial transaction with a teller. This is inconvenient to both the customer, who cannot use the machine and must wait for other customers to perform their financial transactions at a teller window, and to the financial institution, who must staff several teller windows to ensure that tellers can perform routine financial transactions for customers. Conventional systems and methods do not enable a customer who is unable to authenticate him/herself at the financial transaction machine to use the machine to perform a desired transaction.

These and other deficiencies exist.

SUMMARY OF THE INVENTION

An exemplary embodiment includes a system having a tablet computing device configured to receive authentication information from a teller, and receive account information for a customer; an account server configured to: receive the authentication information of the teller, send the account information for the customer, receive an authentication confirmation from the teller with respect to the customer and the account information, send a code for accessing a customer profile at a financial transaction machine without using a physical form of authentication, validate the code and an inputted code, and send the customer profile to the financial transaction machine; and the financial transaction machine configured to: receive the inputted code from the customer, send the inputted code to the account server, receive and load the customer profile to enable the customer to perform a financial transaction at the financial transaction machine.

Another exemplary embodiment includes a computer-implemented method having the steps of receiving from a teller mobile device, identification information for a customer; sending account information to the teller mobile device based on the identification information; receiving a confirmation from the teller mobile device that the customer has been authenticated with respect to the account information; sending a customer profile of the customer to a financial transaction machine; and sending a code to allow the customer to login to the financial transaction machine to access the customer profile and perform a financial transaction at the financial transaction machine without using a physical form of authentication.

A further exemplary embodiment includes receiving, from the teller mobile device, authentication information for a teller; comparing the received authentication information to stored authentication information stored at the account server; and authenticating the teller with the teller mobile device.

In other exemplary embodiments, the preceding methods may be performed using a system with at least one processor and a memory comprising computer-readable instructions which when executed by the processor cause the processor to perform the method steps.

These and other embodiments and advantages will become apparent from the following detailed description, taken in conjunction with the accompanying drawings, illustrating by way of example the principles of the various exemplary embodiments.

DETAILED DESCRIPTION OF THE PREFERRED EMBODIMENTS

Figure 1:
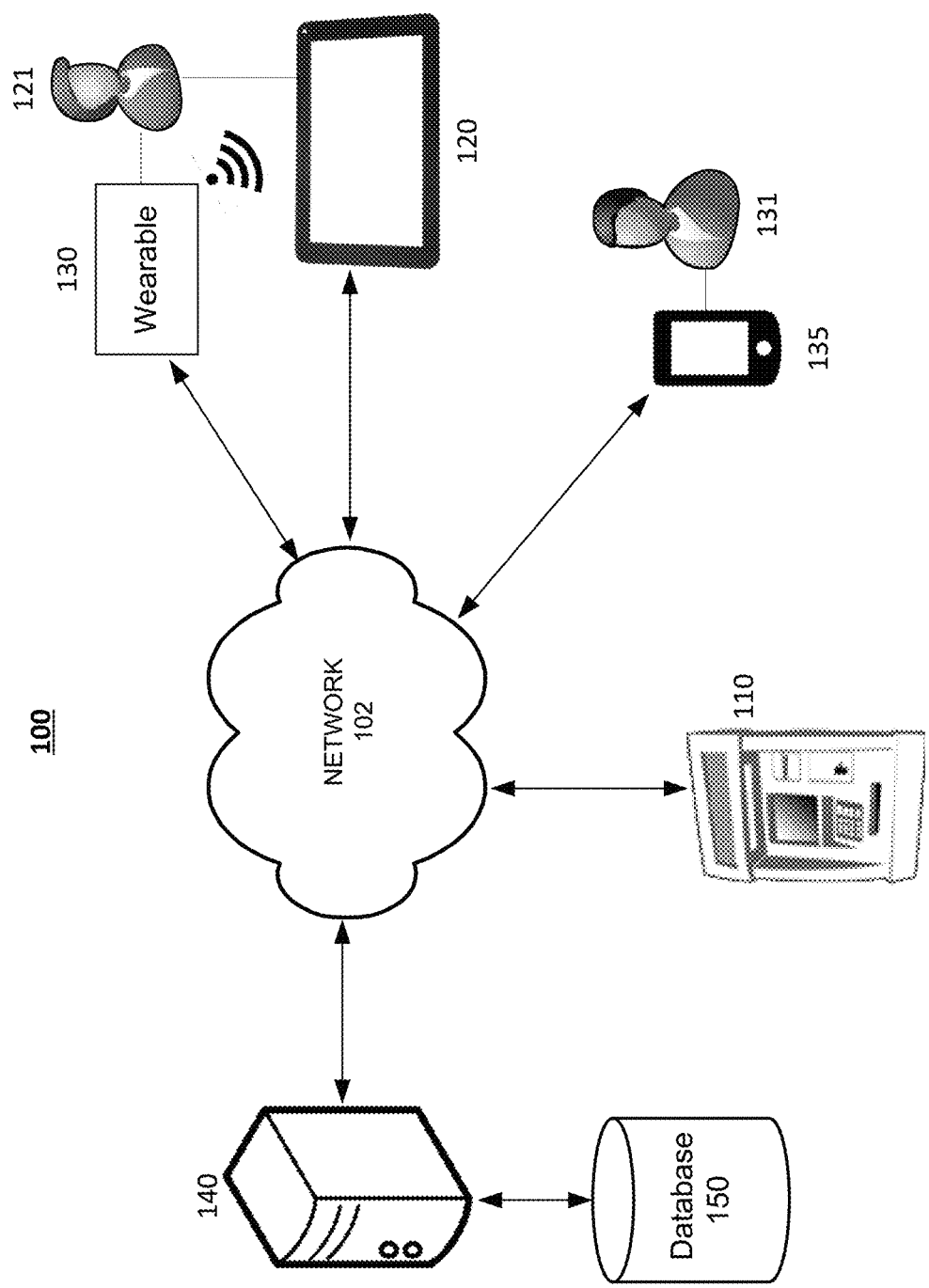
FIG. 1 is a diagram of a system, in accordance with an exemplary embodiment.

It will be readily understood by those persons skilled in the art that the embodiments described herein are capable of broad utility and application. Accordingly, while the invention is described herein in detail in relation to the exemplary embodiments, it is to be understood that this disclosure is illustrative and exemplary of embodiments of the invention and is made to provide an enabling disclosure. Accordingly, the disclosure is not intended to be construed to limit the embodiments or otherwise to exclude any other such embodiments, adaptations, variations, modifications and equivalent arrangements. While the various embodiments of the present invention are described in the context of financial transactions at EBKs and providing of financial services through such devices, the methods and systems described herein may be applied to other related services involving interaction with similar devices.

The following descriptions provide different configurations and features according to exemplary embodiments. These configurations and features may relate to providing financial services through financial services machines, such as EBKs and ATMs. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

"Financial transaction machine," as used herein, may include machines, devices, kiosks, and stations, each of which may be fixed or portable, for performing financial transactions with a financial institution. For example, financial transaction machines may include, but are not limited to, express banking kiosks ("EBKs"), automated teller machines ("ATMs"), personal teller machines ("PTMs"), financial self-service devices, financial services kiosks, financial transaction devices, portable electronic devices, money machines, cash machines, bank machines, and bancomats. Financial transaction machines may be located within or near a branch of a financial institution, a retailer, a merchant, or other public location. It should be appreciated that, while various embodiments are described herein in terms of an EBK, these descriptions are meant to be non-limiting and equally applicable to other forms of financial transaction machines.

The term "customer," as used herein, may refer to an individual who holds at least one account with the financial institution. The at least one account of the customer may or may not be linked to a physical form of authentication, such as a debit card. Physical forms of authentication may include a debit card that is linked to a corresponding personal identification number (PIN), for example. Customers may swipe their debit card at the EBK and then enter their PIN to authenticate themselves at the EBK, i.e., to confirm that they are the owners of the accounts associated with the debit card. For one reason or another, customers may not have their physical form of authentication (e.g., a debit card) with them when visiting an EBK at, for example, a financial institution, but nevertheless may desire to use the EBK.

Referring to FIG. 1, a schematic diagram of a system 100 for remotely loading a customer profile of a customer 131 to an EBK so that the customer 131 can perform a transaction using the EBK is shown, according to an exemplary embodiment. As illustrated, network 102 may be communicatively coupled with one or more data transmitting devices including, for example, EBK 110, network client 120, wearable device 130, customer device 135, and server 140. System 100 of FIG. 1 may be implemented in a variety of ways. Architecture within system 100 may be implemented as a hardware component (e.g., as a module) within a network element. It should also be appreciated that architecture within system 100 may be implemented in computer executable software (e.g., on a tangible, non-transitory computer-readable medium). Module functionality of architecture within system 100 may be located on a single device or distributed across a plurality of devices including one or more centralized servers and one or more mobile units or end user devices.

Network 102 may be a wireless network, a wired network or any combination of wireless network and wired network. For example, network 102 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, network 102 may support an Internet network, a wireless communication network, a cellular network, Bluetooth, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network for simplicity, it should be appreciated that according to one or more embodiments, network 102 may comprise a plurality of interconnected networks, such as, for example, a service provider network, the Internet, a cellular network, corporate networks, or even home networks, or any of the types of networks mentioned above.

Data may be transmitted and received via network 102 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 shows a single EBK 110, network client 120, wearable device 130, customer device 135, server 140, and database 150, it should be appreciated that there may be several of such devices to carry out the various embodiments. For example, EBK 110 may represent several EBKs, any one of which may be used to practice the various embodiments. Again, the use of EBKs is meant to be non-limiting and, may include, but are not limited to, automated teller machines ("ATMs"), personal teller machines ("PTMs"), financial self-service devices, financial services kiosks, financial transaction devices, portable electronic devices, money machines, cash machines, bank machines, and bancomats, for example. EBK 110 may comprise, for example, a display, which may be touch-sensitive or otherwise; an alpha-numeric and/or QWERTY keyboard, either physical or virtual, for receiving input; a pointing device, such as a trackball, track wheel, or mouse, for example; a scanning camera to scan a code displayed or presented by customer 131; a cash dispenser; a check and/or cash receiver; a printer, such as for printing receipts, for example; a biometric scanner, such as a fingerprint or retinal scanner; and communication chipsets for communicating with other devices, such as server 140, tablet 120, and/or customer device 135, directly or via network 102, for example.

Network client 120 may be used by an employee or agent of a financial institution, such as a teller 121 or other representative of the financial institution (referred to generally as teller 121). Network client 120 may be a desktop computer, a laptop computer, a tablet computing device, a server, a personal digital assistant, a smartphone, a smartwatch, a smartTV, smart glasses, or other computer capable of sending or receiving network signals. In a preferred embodiment, network client 120 is a tablet computing device carried by a teller 121, and reference will be made to tablet 120.

Wearable 130 may also be used by an employee or agent of a financial institution, such as a teller 121 or other representative of the financial institution. For example, the same teller 121 that carries around tablet 120 may also possess a wearable device 130, which may be used to authenticate the teller 121 with tablet 120 and server 140. Wearable device 130 may comprise a smartphone, watch, bracelet, cufflink, clothing, earring, jewelry, activity tracker, health monitoring device, heart rate monitor, or glasses, for example.

Mobile device 135 may be in the possession of a customer 131 and may be used to aid the customer 131 in gaining access to their profile at EBK 110. Mobile device 135 may be a mobile communications device, a smartphone, a tablet computing device, a wearable computer such as in the form of a wrist watch, bracelet, glasses, or the other wearables mentioned above, a personal digital assistant, a handheld multimedia device, or other devices capable of transmitting data wirelessly. In a preferred embodiment, mobile device 135 is a smartphone carried by a customer 131, and reference will be made to smartphone 135.

EBK 110, tablet 120, wearable 130, and smartphone 135 may communicate with each other using a wireless connection, and may utilize WiFi, 3G, 4G, LTE, Bluetooth, ZigBee, or other chipsets and specifications. For example, wearable 130 may wirelessly communicate data to tablet 120 for the purpose of authenticating a teller 121 with tablet 120 and/or server 140. By way of further example, tablet 120 and/or server 140 may wirelessly communicate data to smartphone 135 to aid a customer 131 in gaining access to their profile at EBK 110. Data communicated from tablet 120 and/or server 140 to smartphone 135 may comprise a one-time code (e.g., an access code) and/or an EBK identifier, for example.

Server 140 may perform operations associated with authenticating the teller 121 and customer 131, loading a customer profile to the EBK 110, and performing the financial transaction requested by the customer 131. Server 140 may comprise one or more servers and/or general purpose computers, each having one or more computer processors associated therewith.

Server 140 may be communicatively coupled with database 150. Database 150 may contain data and information used by the system 100. For example, the database 150 may store account data for customers 131 and customer profile data. Database 150 may also contain additional information related to the operation and administration of the system 100. Database 150 may include any suitable data structure to maintain the information and allow access and retrieval of the information. For example, database 150 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Database 150 may be any suitable storage device or devices. The storage may be local, remote, or a combination thereof with respect to database 150. Database 150 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Database 150 may have back-up capability built-in. Communications with database 150 may be over a network, such as network 102, or communications may involve a direct connection between the database 150 and server 140, as depicted in FIG. 1.

Figure 2:
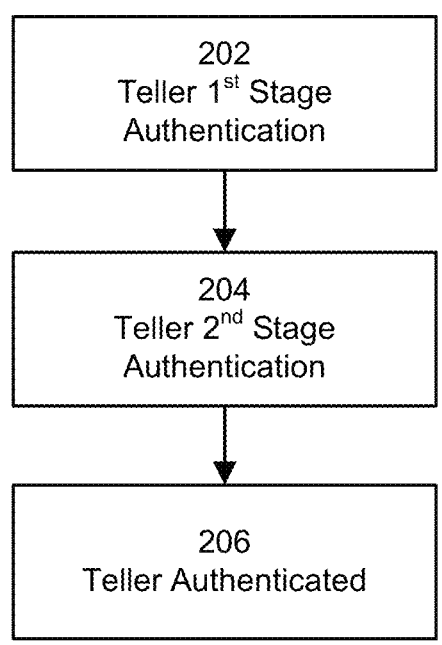
FIG. 2 is a flow chart of a method of authenticating a financial institution employee, in accordance with an exemplary embodiment.
Figure 3:
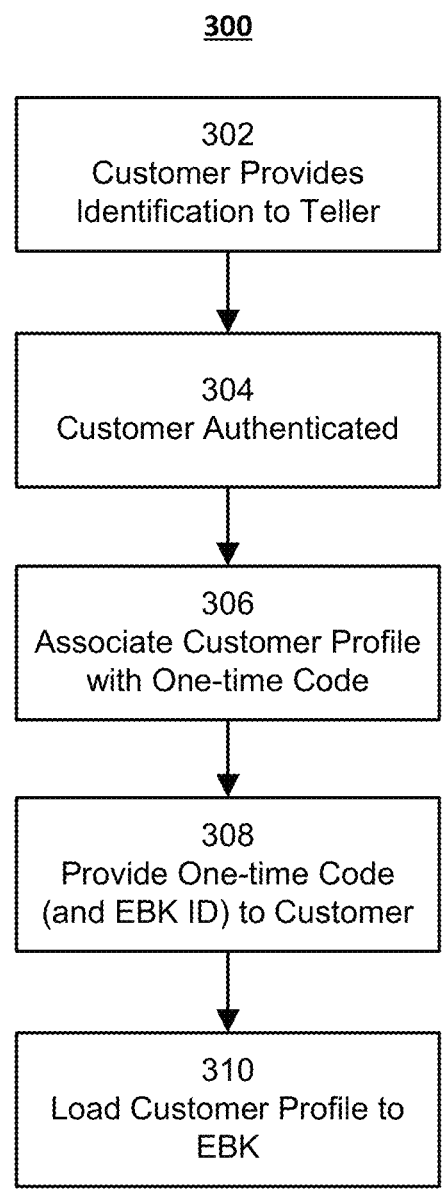
FIG. 3 is a flow chart of a method of loading a customer profile to a financial transaction machine, in accordance with an exemplary embodiment.
Figure 4:
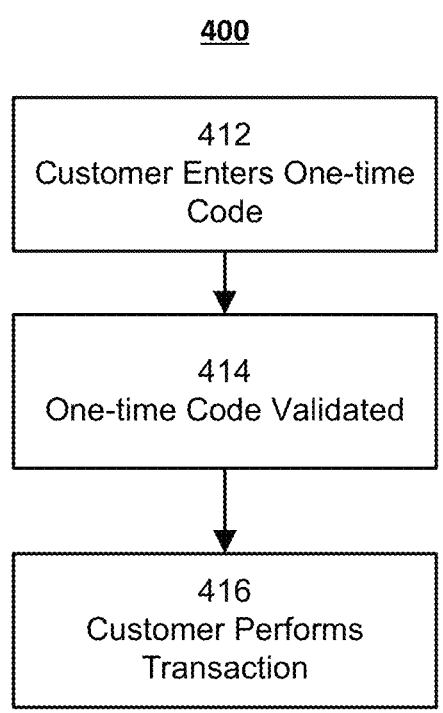
FIG. 4 is a flow chart of a method of gaining access to a customer's profile at an EBK without a form of authentication, such as a debit card, so as to perform a financial transaction, in accordance with an exemplary embodiment.

Referring to FIGS. 2-4, illustrative flowcharts are shown for methods of loading a customer profile onto an EBK to thereby enable the customer 131 to carry out a transaction. The exemplary methods 200, 300, and 400 are provided by way of example, as there are a variety of ways to carry out methods according to the present disclosure. Methods 200, 300, and 400 shown in FIGS. 2-4 can be executed or otherwise performed by one or a combination of various systems and modules. Methods 200, 300, and 400 described below may be carried out by system 100 shown in FIG. 1, by way of example, and various elements of the system 100 are referenced in explaining the exemplary methods 200, 300, and 400 of FIGS. 2-4. Each block shown in FIGS. 2-4 represents one or more processes, decisions, methods or subroutines carried out in exemplary methods 200, 300, and 400, and these processes, decisions, methods or subroutines are not necessarily carried out in the specific order outlined in FIGS. 2-4, nor is each of them required.

Referring to FIG. 2, exemplary method 200 may be carried out to authenticate a teller 121 at a financial institution with tablet 120 and/or server 140. Exemplary method 200 may begin at block 202. At 202, a first stage of authentication involving the teller 121 may occur. Preferably, dual authentication is used, such that two stages of authentication are performed. In the first exemplary stage of authentication, wearable 130 may transmit data to tablet 120. Such data may be transmitted to tablet 120 (or inputted to tablet 120) upon request of the teller 121, or may be transmitted continuously and automatically. The transmitted data may be considered first authentication information or first stage authentication data and may comprise biometric information associated with the teller 121, such as a current heart rate of the teller 121 or a fingerprint scan of the teller 121. Tablet 120 may compare the first stage authentication data with an expected value (or image), such as an expected value of the teller's heart rate, for example. Such expected values may be stored locally on tablet 120 or on server 140. If stored on server 140, tablet 120 may transmit the first stage authentication data to server 140 for comparison with the expected value. Such expected values may be stored in tablet 120 and/or database 150 based on a preliminary authentication of the teller 121 with system 100 where the identity of the teller 121 is linked to various authentication data (such as heart rate, fingerprint, etc.). If the first stage authentication data matches the expected value (such as falling within a predefined tolerance value, for example), then the process may advance to 204.

At 204, tablet 120 may prompt the teller 121 to input second authentication information or second stage authentication data. Second stage authentication data may comprise a personal identification number ("PIN") chosen by, or assigned to, the teller 121. Other exemplary second stage authentication data may comprise information that is preferably known only to the teller 121 and system 100. Tablet 120 (or server 140) may compare the second stage authentication data with an expected value, which may be stored on tablet 120 or on server 140. As explained above, if the expected values are stored on server 140, tablet 120 may transmit the second stage authentication data to server 140 for comparison with the corresponding expected value. If the second stage authentication data matches the expected value (such as being an exact match, for example), then the process may advance to 206.

At 206, the teller 121 may be authenticated with tablet 120 and server 140. Once authenticated, the teller 121 may be permitted to send queries and requests to server 140 to thereby assist a customer 131 with authentication. Teller authentication 200 may be required each time a teller 121 wishes to assist a customer 131 with customer authentication, or may be required after a pre-determined period of time, such as three minutes, five minutes, fifteen minutes, or one hour, for example. Teller authentication may be required each time to prevent a non-teller (i.e., a person other than the teller) from using tablet 120 to authenticate themselves or authenticate another non-teller with EBK 110 and/or server 140, after the teller 121 has been authenticated. Such a requirement may prevent unauthorized authentications of non-tellers should tablet 120 be misplaced or stolen after the teller 121 has been authenticated with tablet 120.

FIG. 3 shows an exemplary method for loading a customer profile to an EBK 110. After teller authentication 200, the teller 121 may assist a customer 131 (e.g., someone who does not have a physical form of authentication, such as a debit card, but desires to perform a financial transaction at EBK 110) with authentication and loading the customer's profile to an EBK 110. Referring to FIG. 3, a customer 131 who is in physical proximity to teller 131 may provide a form of identification to the teller 121. Such identification may comprise a driver's license, a passport, a green card, a social security number, or other government-issued ID or number; a bank-issued card, identification, or code, such as a credit card, account number, or PIN; or the customer's (full) name, for example. Other forms of identification may comprise answers to previously-established security questions, for example.

In an alternative embodiment, customer 131 may approach EBK 110 without a form of authentication. A GUI on EBK 110 may prompt the user to enter an identification number (e.g., those listed above, such as the customer's social security number). For example, a GUI on EBK 110 may say, "Don't have your debit card? Press [here]." The "[here]" may be a portion of the touchscreen or a key on a keypad, for example. After pressing the specified key or screen portion, customer 131 may be instructed to enter their name and/or an identification number (e.g., a social security number). Moreover, when customer 131 presses the specified key or screen portion, or enters their name and/or identification number, teller 121 may be alerted that customer 131 needs assistance. An alert may be sent to tablet 120 in the possession of teller 121, and may specify which EBK 110 the alert was received from and may also specify any information that customer 131 entered into EBK 110 that prompted the alert. After being alerted, teller 121 may initiate the customer authentication process, as outlined in FIG. 3 and explained in further detail below. Teller 121 may also come to aid customer 131 at the location of EBK 110 so as to be able to authenticate customer 131.

Customer 131 may provide other information to teller 121, such as biometric information. For example, teller 121 may temporarily allow customer 131 to perform a fingerprint scan or retinal scan using tablet 120, for example. Such biometric information may be temporarily stored on tablet 120 for transmission to server 140, as discussed further below.

Teller 121 may compare the provided form of identification with the customer 131 (e.g., compare picture on driver's license with customer's appearance). Teller 121 may further enter information provided by customer 131 into tablet 120. For example, teller 121 may enter one or more of a driver's license number, a social security number, a code, an account number, a card number (e.g., a credit card number for a credit card issued by the financial institution), a PIN, and/or the customer's name, for example. Upon entering such information, the information (including, potentially, biometric information) may be transmitted to server 140 and compared to data stored in database 150. Server 140 may transmit a name or a list of names to tablet 120, such as a name of a customer of the financial institution that corresponds exactly to the provided information, or a list of names of customers of the financial institution that corresponds partially to the provided information. Server 140 may transmit a picture or account information along with or separate from the name or list of names.

Teller 121 may select the single name, picture, and/or account information provided by server 140, so as to confirm that the customer 131 matches that name, picture, and/or account information. Alternatively, teller 121 may select the correct name, picture, and/or account information from the list of names, pictures, and/or account information provided by server 140, after confirming additional information with customer 131. For example, teller 121 may compare a name listed on the customer's form of identification (e.g., driver's license) to the name(s) provided by the server; compare the appearance of customer 131 to a picture(s) provided by server 140; ask customer 131 about the identity of a joint account holder, or the location of where the customer 131 first opened his/her account with the financial institution, for example, so as to compare such information with information provided by server 140. If the information provided by the customer 131 matches exactly to one name provided by server 140, then teller 121 can confirm that the customer 131 matches one name provided by server 140. Accordingly, the process may proceed to 304, where the customer 131 is authenticated with the teller 121 and with server 140.

At 306, a customer profile of customer 131 may be linked to a code, such as a one-time use code. "Customer profile," as used herein, refers to information about customer 131, such as name, contact information, account information, security information, etc. Name may include first name, middle name, surname, maiden name, nickname, title, or suffix, for example. Contact information may include telephone number(s), mailing address, email address, social media identifiers, or other information that may be used to contact customer 131. Account information may comprise all data regarding accounts of customer 131 with the financial institution, including, but not limited to, account types, account numbers, account balances, account histories, account transactions, available balances, credit limits, joint account holders, bills due, and/or loan payoff amounts, for example. Account information may further comprise customer account information for accounts linked to a physical form of authentication associated with the customer, such as a debit card. Security information may comprise personal identification numbers (PINs) associated with accounts of customer 131, withdrawal limits, credit limits, or risk scores associated with customer 131, for example.

Referring again to 306 in FIG. 3, the "code" may be a one-time code in that it may be used only once at EBK 110 to access the customer profile of customer 131 without using a corresponding physical form of authentication (such as a debit card). In a preferred embodiment, only after a customer profile is linked or associated with a code may that code be used to by customer 131 to access the customer profile and thereby perform a financial transaction. The code may be, for example, a QR code, a pseudo-randomly computer-generated code, or any number or sequence of alpha and/or numeric characters, preferably one that can be entered quickly at EBK 110 by customer 131. Although the code may be a one-time code, it need not be a code that is unfamiliar to customer 131. For example, the code may be the customer's previously-established four digit PIN, the customer's social security number, the customer's birthday, the customer's cell phone number, or the middle name of the customer's mother, for example. Each of these are presumably known to customer 131 and need not be expressly communicated or shown to customer 131 by teller 121 or electronically, such as via a text message or on a display (e.g., a display of tablet 120). Rather, at step 308, teller 121 may simply instruct customer 131 to enter the code (e.g., the customer's birth year), at EBK 110, without informing customer 131 of the actual code (e.g., the customer's four digit birth year), and in this manner may be said to "provide" the code to customer 131.

Alternatively, the code may be unfamiliar to customer 131 and it may be necessary to communicate the actual code value to customer 131 by teller 121 or electronically. At step 308, teller 121 may simply provide the code to customer 131 audibly, or by writing the code for customer 131 on a piece of paper, or by displaying the code to customer 131 using tablet 120, for example. Alternatively or additionally, the code may transmitted electronically to customer 131, by teller 121 and/or by server 140, such as by a text message to a smartphone 135 of customer 131, or by email to an email address of customer 131, for example. Text messages and/or emails may include text, pictures, videos, and/or audio, for example.

Alternatively or additionally, the code may be sent to an application or program. For example, the code may be sent to smartphone 135 that has an application installed thereon. The application may be associated with the financial institution. For example, the application may be a banking application provided by the financial institution or a third party through which the customer 131 can perform some transactions or account administration actions on their accounts that are held by the financial institution.

In some embodiments, the customer's smartphone 135 may be required to be registered with the financial institution and associated with the customer profile of customer 131. The registration may be used to verify the phone number and to prevent unauthorized use of the method described herein in the event the code is somehow sent to the wrong device or obtained by another party.

Along with the transmitted code, a link may be sent. The link may be required to be actuated to validate the mobile phone number and activate the code. The link may be actuated by clicking the link. Customer 135 may receive an electronic notification of the actuation of the link. For example, customer 135 may receive an email or a text message.

The code may have an expiration time associated with it. For example, a code may be valid only for a particular period of time, such as sixty seconds, three minutes, or fifteen minutes, for example, after which the code will expire and may no longer be used to access the customer profile for customer 131 on EBK 110 without a physical form of authentication (such as a debit card). Moreover, once the code is used to access a customer profile on EBK 110, the code may expire, e.g., after inputting the code or after customer 131 has completed the desired transaction and ended the session. In a preferred embodiment, customer 131 only requires the code (and no corresponding card for authentication, for example) to access their customer profile on EBK 110. This may be the case because the customer 131 was previously authenticated with teller 121 and/or server 140, as described above. In the event the code is related to, or the same as, a code used to login under normal circumstances (e.g., a PIN used to login with a debit card at EBK 110), then the code may still expire because such expiration would not impact a separate login procedure where customer 131 uses forms of authentication (e.g., a debit card) in addition to the code (e.g., PIN).

In addition to providing a code to customer 131, a particular EBK 110 may also be identified for customer 131 to use. For example, customer 131 may be instructed to enter the provided code at "EBK No. 7." "EBK No. 7" may represent an EBK 110 at the customer's current location (e.g., a branch of the financial institution that the customer 131 is visiting). Server 140 may have a current record of which EBKs are currently being used, and which EBKs are not currently being used. Preferably, an identified EBK 110 is not currently in use by another customer. Server 140 may be able to identify a particular EBK 110, such as an EBK 110 that is not currently in use, to teller 121 and/or directly to customer 131, along with the code discussed above. For example, customer 131 may be instructed by teller 121 or server 140 to "Please enter your birth year at EBK No. 7 to perform your transaction." Such instruction may be conveyed to customer 131 by teller 121 and/or server 140 by electronic transmission, writing, or audibly, as discussed above.

At 310, the customer profile of customer 131 may be loaded to EBK 110. This may occur before, after, or while customer 131 is entering the code into EBK 110. Accordingly, the step 412 in FIG. 4 of entering the code into EBK 110 is separated from the step 310 in FIG. 3 of loading a customer profile to the EBK 110. Loading a customer profile to an EBK involves transmitting data packets that include the customer profile from server 140 (and database 150) to EBK 110 and storing (for example, temporarily) the customer profile on the EBK 110 to enable customer 131 to access their customer profile on the EBK 110 and thereby perform a financial transaction using EBK 110. In a preferred embodiment, immediately upon the customer 131 being authenticated with teller 121, the customer profile of customer 131 is loaded to the EBK 110 that customer 131 will use to perform a financial transaction.

Referring to FIG. 4, at 412 customer 131 enters the code he/she received into EBK 110. Customer 131 may use a physical or virtual alphanumeric keypad, for example, on EBK 110 to enter the code. Alternatively, for example, in the case of a QR code or another complex code, the code may be scanned at EBK 110 by the customer 131 holding the code (e.g., as displayed on a screen of smartphone 135 or printed on a piece of paper) up to a scanning camera on EBK 110. Customer 131 may also be requested to provide additional information, such as biometric information or a phone number to which the code may have been sent. For example, a fingerprint scan or retinal scan at EBK 110 may be used to (again) confirm the identity of customer 131, or an inputted phone number may be used to verify that customer 131 is in possession of the smartphone 135 that received the code.

At 414, the inputted code may be validated. Validation may comprise sending the inputted code from EBK 110 to server 140. EBK 110 may send an identification number for the EBK 110 that received the inputted code along with the inputted code to server 140. At server 140, the inputted code may be compared with the code provided to customer 131 (directly from server 140 or via teller 121, for example). Additionally, if customer 131 was instructed to use a particular EBK 110, the identification number for the EBK 110 that received the inputted code may be compared to an identification number for the particular EBK 110 that customer 131 was instructed to use. This is to ensure that an eavesdropper is unable to use a code provided to customer 131 at a different EBK 110 in an attempt to access the customer profile of customer 131 before customer 131 uses such code. If the code had an expiration time, then a time that the code was inputted into EBK 110 may be compared to a time that the code was sent to ensure that the code was used within the code's expiration time. If the code, EBK identification number, and/or code expiration time all match and/or are validated, then customer 131 may proceed to initiate his/her desired transaction at EBK 110.

If a customer 131 was instructed to use a particular EBK 110, then the customer profile may be loaded to that particular EBK 110 before or while customer 131 is entering the code into EBK 110. In this manner, the customer profile may immediately be accessed by customer 131 after entering the code into EBK 110. This is advantageous because customers are typically in a hurry when using an EBK. Alternatively, the customer profile may be loaded to EBK 110 after customer 131 has entered the code and inputted any other potentially requisite information (e.g., fingerprint scan).

At 416, customer 131 may perform their desired transaction. A transaction may involve withdrawing cash from a checking or savings account, depositing a check, or making a payment to one or more accounts of customer 131 using one or more accounts of the customer 131, for example. Inputs from the customer 131 at EBK 110 are recorded by EBK 110 and/or server 140 and the customer profile of customer 131 is updated accordingly.

In various embodiments, a specific EBK 110 may not be indicated. The customer may be able to approach any EBK 110 and enter the code. Once verified, the customer's profile may be pulled by the EBK 110 to allow the customer to conduct the desired financial transaction. Once the code is entered, EBK 110 may transmit the code to server 140 along with a request for the customer profile of customer 131. Assuming the inputted code matches the code previously communicated to customer 131, then server 140 may send the customer profile of customer 131 to EBK 110. Because EBK 110 sent a request for the customer profile, the customer profile maybe said to be "pulled" by EBK 110. In other embodiments, the customer profile of customer 131 may be pushed to all available EBKs such that the customer may use any EBK 110 and the customer profile is already loaded. For example, upon sending a code to customer 131 and/or teller 121 (e.g., to smartphone 135 and/or tablet 120), server 140 may "push" the customer profile of customer 131 to each EBK 110 at the location that customer 131 may be visiting and at which teller 121 may be located. "Pushing" the customer profile may also comprise "pushing" the code that was sent to customer 131, and storing the customer profile and code in a temporary memory on EBK 110, such that the code can be validated directly at the EBK 110 using, for example, a processor on EBK 110. Thus, customer 131 would not have to wait to access his/her customer profile after entering a valid code at EBK 110 because the customer profile would effectively be waiting for the customer 131, thereby speeding up the financial transaction process.

Figure 5:
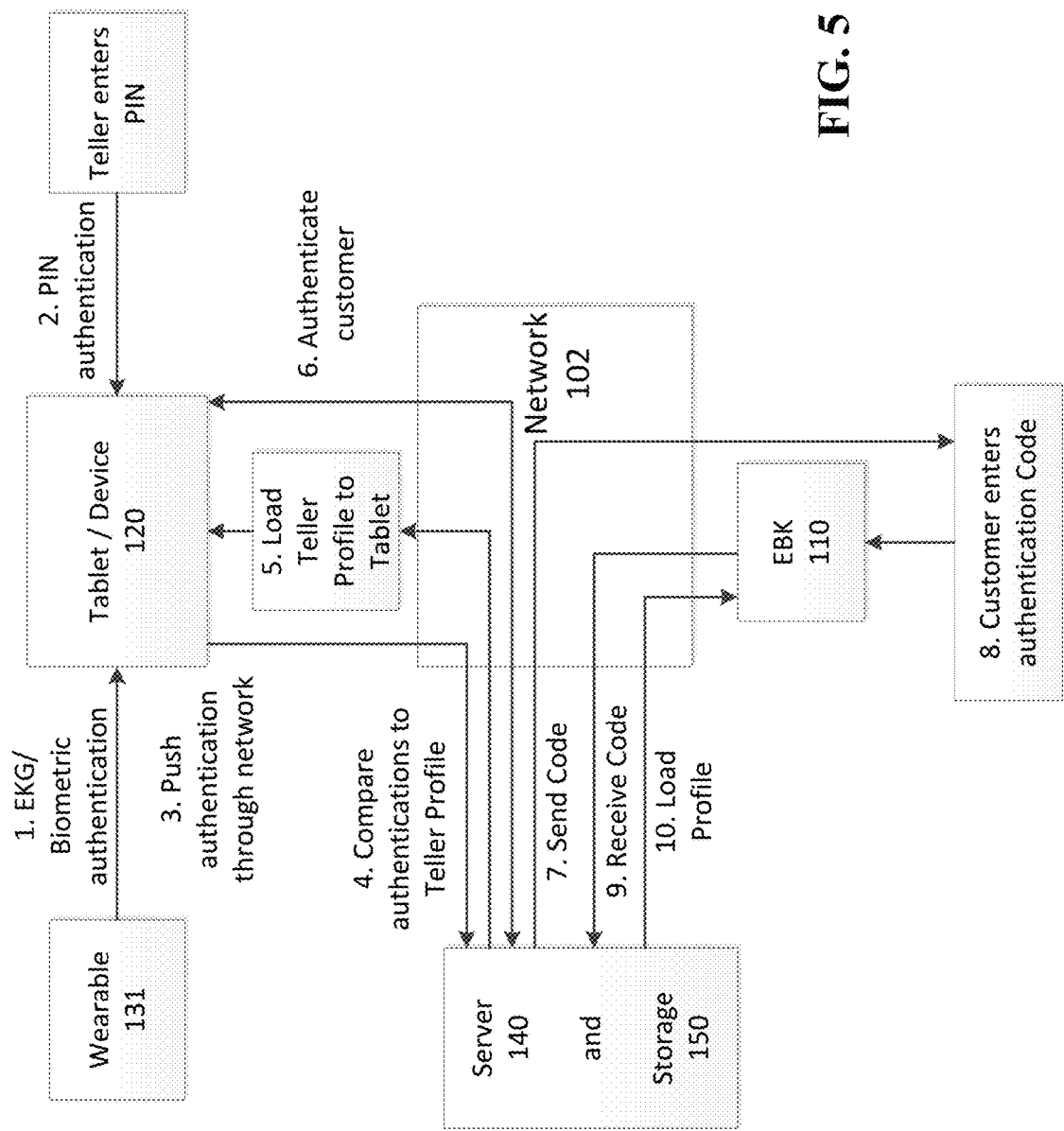
FIG. 5 depicts a general flow chart of an exemplary process for authenticating a teller, authenticating a customer, sending and receiving a code, and loading a customer profile to an EBK.

FIG. 5 depicts a general flow chart of an exemplary process for authenticating a teller 121, authenticating a customer 131, sending and receiving a code, and loading a customer profile to an EBK. At 1, tablet 120 may receive first authentication information from the teller 121, such as in the form of electrocardiograph (EKG) data or biometric data from a wearable device worn by teller 121. At 2, tablet 120 may receive second authentication information from teller 121, such as in the form of a PIN entered into tablet 120 by teller 121. At 3, the first and second authentication information (for teller 121) may be pushed through the network 102. At 4, the first and second authentication information may be compared to profile data for teller 121 stored in storage 150. If the first and second authentication information match information in the profile data for teller 121, then the first and second authentication information is validated and a profile of teller 121 is pushed or loaded to tablet 120 via network 102. At 6, teller 121 may authenticate customer 131 by receiving information from customer 131 and exchanging information with server 140 and storage 150 via network 102. At 7, server 140 may send a code (or identification of a code, such as "last four digits of your social security number") directly to customer 131 and/or indirectly via teller 121 (tablet 120). At 8, customer 131 may enter the code into EBK 110. At 9, server 140 may receive the entered code and compare to the code stored in storage 150. If the entered code matches the sent code, then customer 131 may be validated and, at 9, server 140 may load the customer profile of customer 131 to EBK 110.

Figure 6:
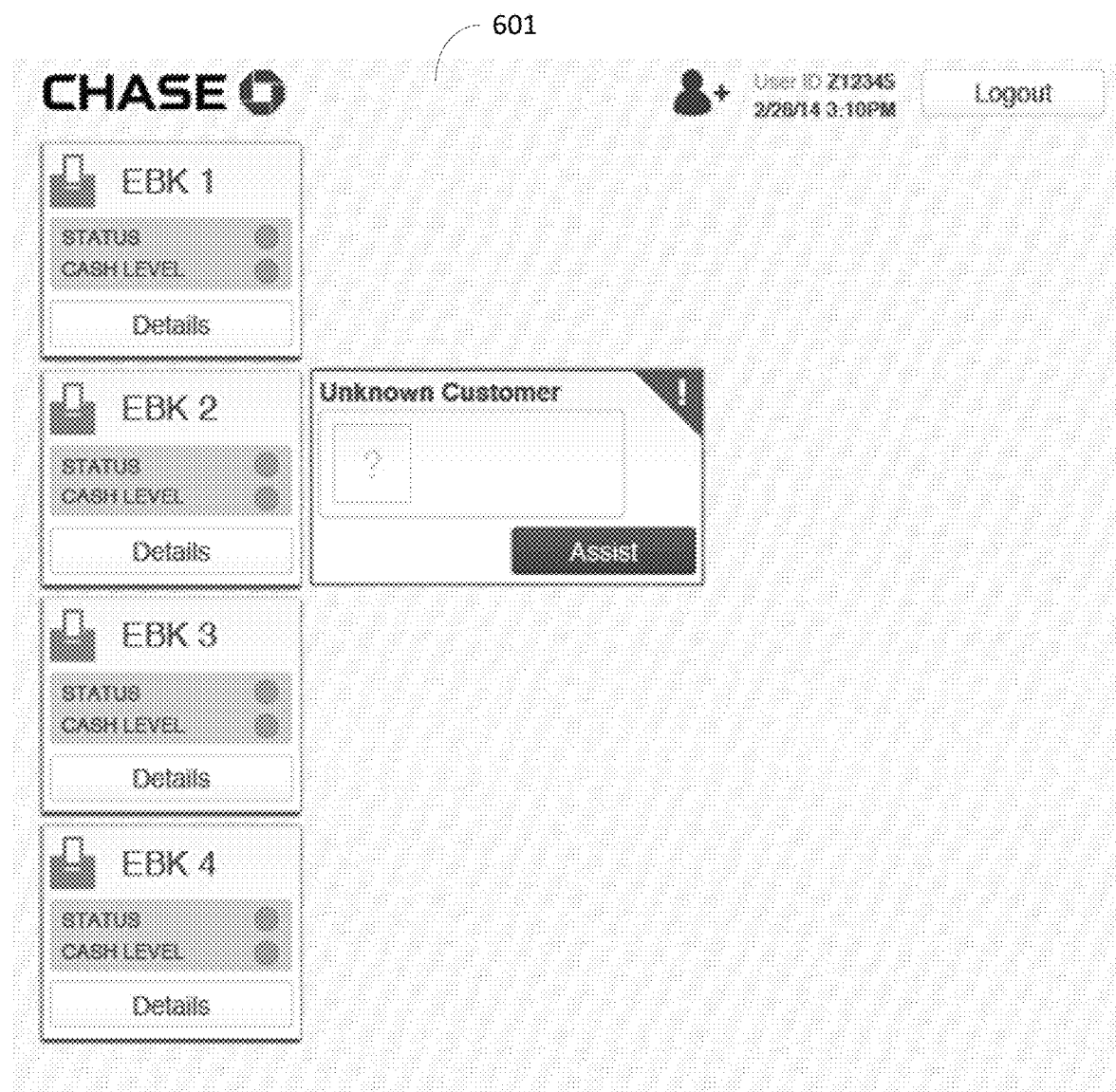
FIGS. 6-15 depict exemplary graphical user interfaces (GUIs) as may be depicted on a tablet in the possession of a teller, in accordance with an exemplary embodiment.

FIGS. 6-15 depict exemplary graphical user interfaces (GUIs) as may be depicted on a tablet 120 of a teller 121. For example, FIG. 6 depicts a GUI 601 listing EBKs at a particular financial institution. An "Unknown Customer" is indicated to be at EBK 2 (e.g., EBK 110 in FIG. 1), and teller 121 may have the option to "Assist" such a customer. The exemplary designation of "Unknown Customer" may appear on GUI 601 if EBK 2 detects (e.g., by a camera) a customer 131 standing at EBK 2 for a predetermined amount of time (e.g., 1 minute) or a customer 131 at EBK 2 has entered an incorrect form of authentication and/or an incorrect authentication code (e.g., PIN). With such indications on GUI 601, teller 121 may determine whether to step in to assist customer 131.

Figure 7:
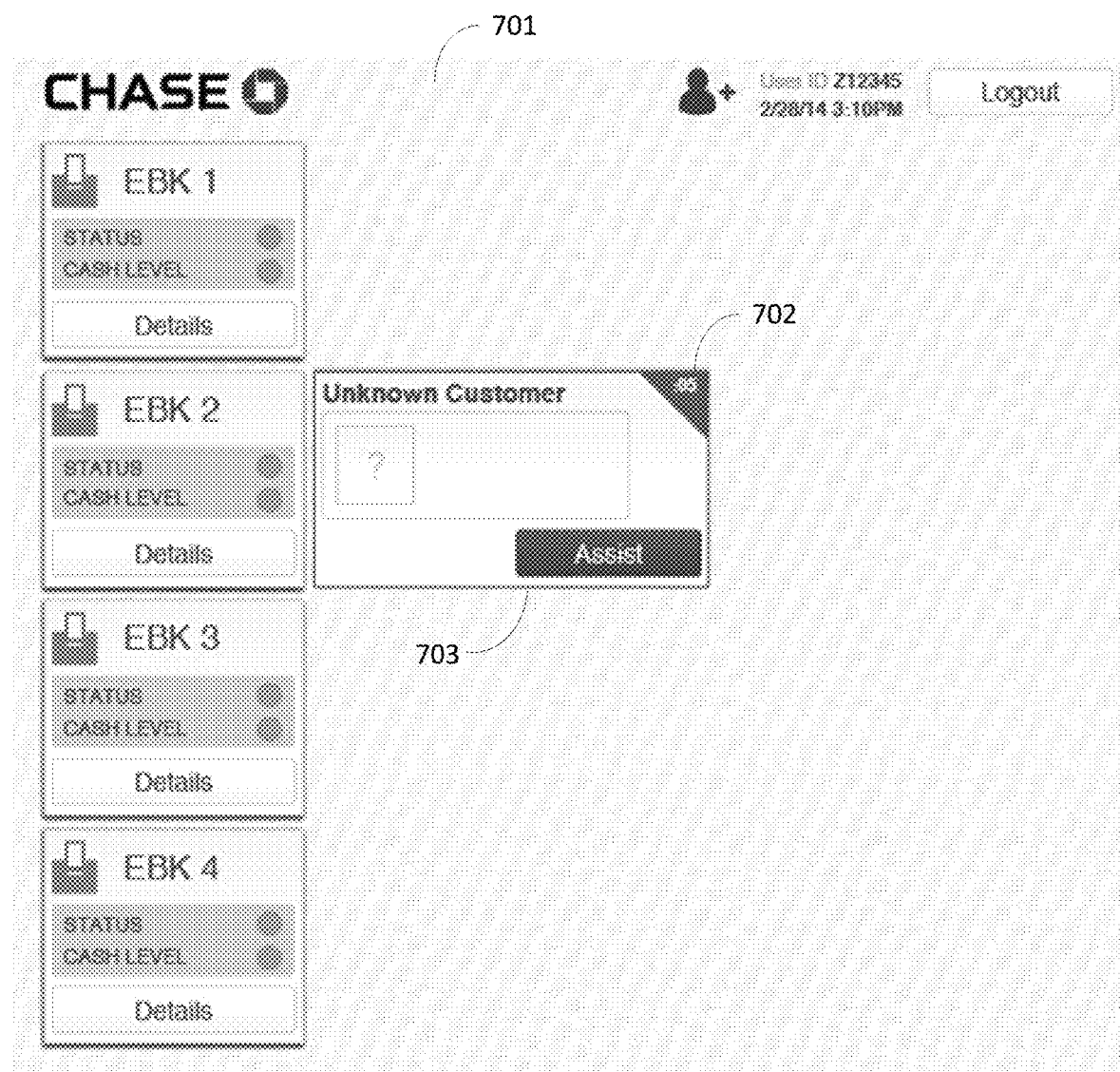

FIG. 7 depicts a GUI 701 similar to GUI 601 in FIG. 6. A timer 702 in a corner of box 703 may indicate that the customer 131 at EBK 2 (e.g., EBK 110 in FIG. 1) has indicated a desire to be helped. For example, customer 131 may select an option on EBK 2, such as "Forgot your card?" or "Forgot your PIN?" or "Don't have your debit card?" on the screen or keypad of EBK 2. After customer 131 has selected this type of option on EBK 2, timer 702 may begin to count upward to indicate the amount of time since customer 131 has indicated he/she would like assistance.

Teller 121 may select "Assist" on GUI 701 and a message may be transmitted to EBK 2 to inform customer 131 that someone is coming to aid customer 131, or to inform customer 131 to speak with teller 121.

Figure 8:
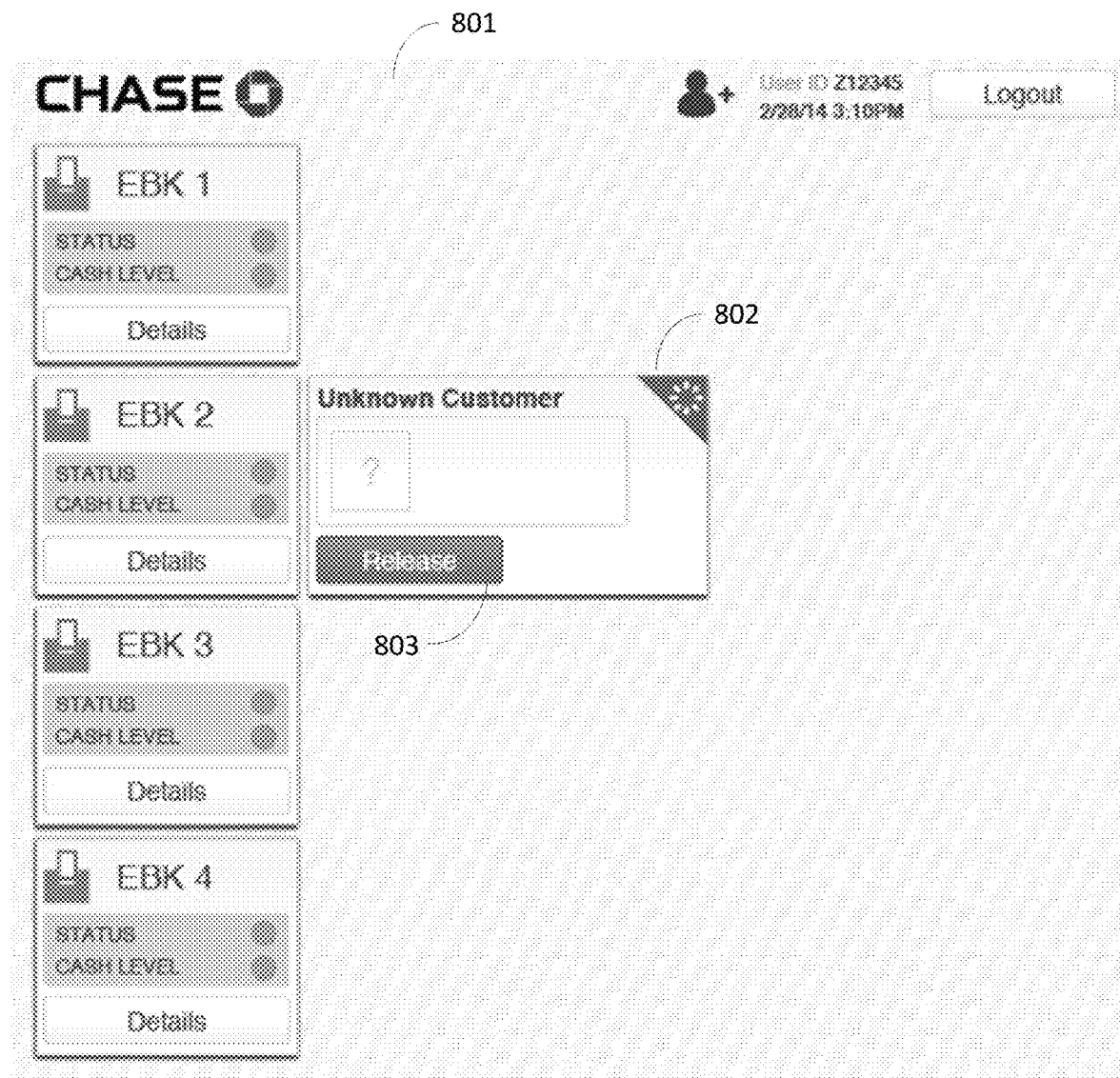

FIG. 8 depicts a GUI 801 similar to GUI 701 in FIG. 7. After teller 121 has selected "Assist," as shown in FIG. 7, a "Release" option 803 may be displayed on GUI 801. Selecting "Release" may break a communication link between tablet 120 and EBK 2 (e.g., EBK 110 in FIG. 1). A spinning wheel or other animated icon 802 may indicate that data is being communicated between tablet 120 and EBK 2.

Figure 9:
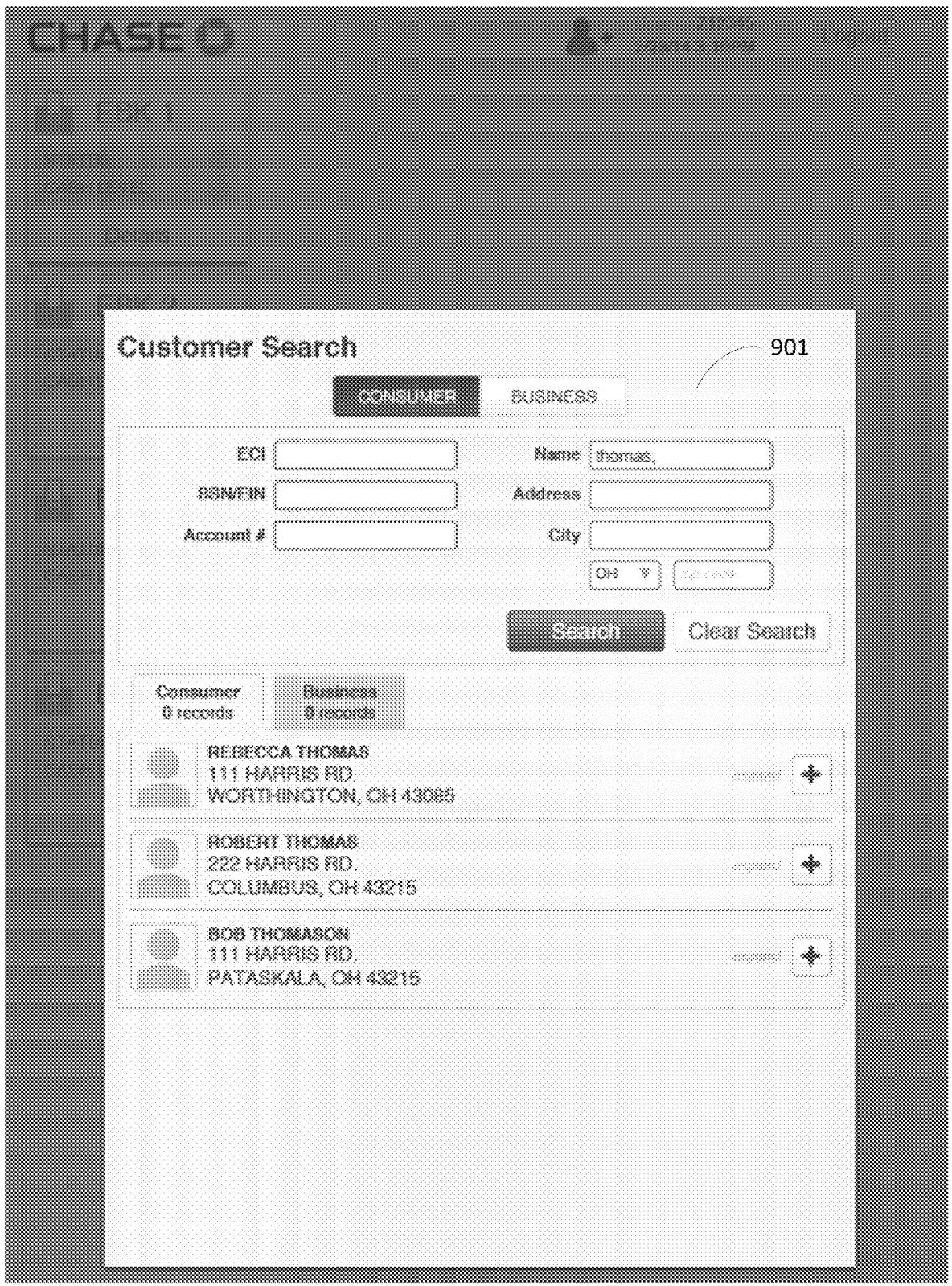

FIG. 9 depicts a GUI 901 in which teller 121 can search for records of a customer 131. As explained above, as teller 121 enters information into GUI 901 on tablet 120, information may be received from server 140, such as information on customers of the financial institution corresponding to information entered by teller 121 on tablet 120. For example, teller 121 may enter "thomas" and server 140 may return information on customers having "thomas" in their customer name.

Figure 10:
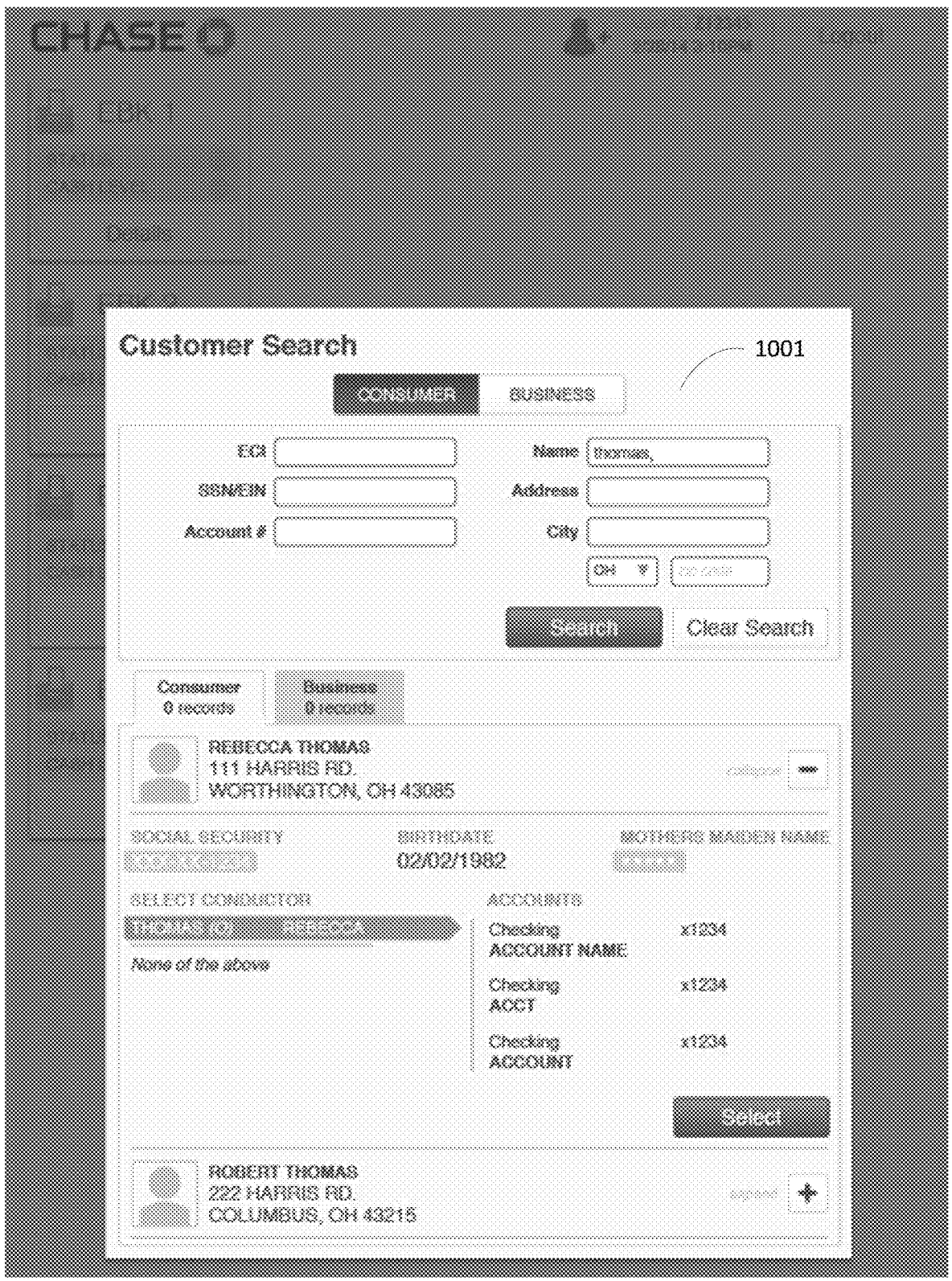

FIG. 10 depicts a GUI 1001 in which teller 121 has selected one of the customers listed in FIG. 9. After selecting a particular customer, further information about the customer and the customer's accounts may be displayed to teller 121 via GUI 1001. For example, each account that the customer 131 has with the financial institution may be listed on GUI 1001. Other exemplary information may be shown on GUI 1001, as indicated in FIG. 10.

Figure 11:
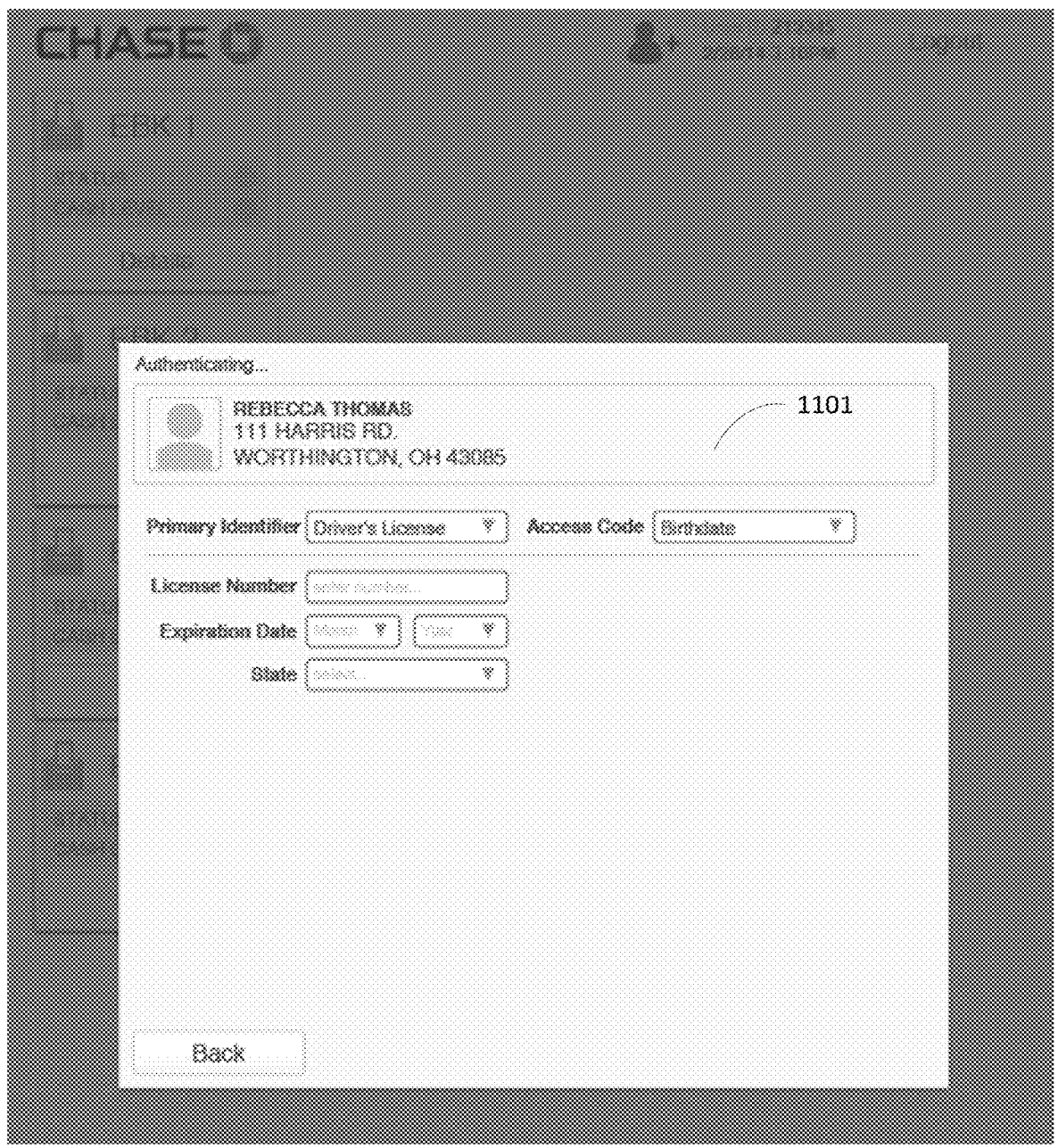

FIG. 11 depicts a GUI 1101 which may be displayed after teller 121 selects a particular customer from GUI 1001. After selecting "REBECCA THOMAS," for example, GUI 1101 may be shown, in which teller 121 can enter information as retrieved from customer 131. Teller 121 may select a type of "Primary Identifier" such as a driver's license, passport, green card, or other forms of identification as explained above. Then, teller 121 may request information corresponding to the "Primary Identifier," such as a driver's license number, expiration date, and state of issuance, for example. Teller 121 may also select which type of "Access Code" may be used to allow customer 131 to access their customer profile on EBK 110, for example. As explained above, the "Access Code" or simply "code" may be the customer's birthdate, previously-established PIN, social security number, cell phone number, mother's middle name, a portion of any of the foregoing exemplary information, or a random number or alphanumeric combination, for example. Other types of access codes, or simply "codes," may be chosen, such as those referred to above.

Figure 12:
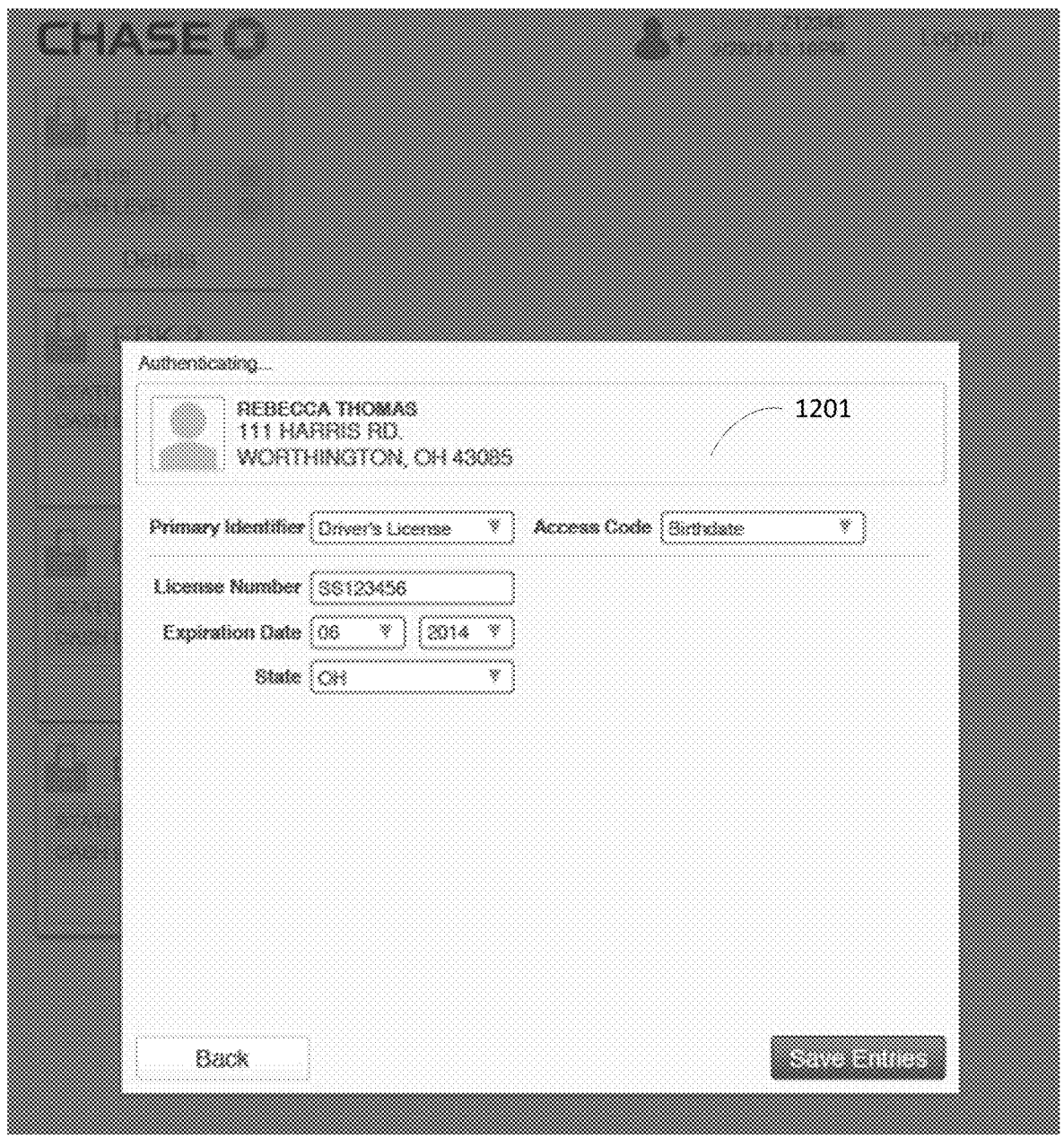

FIG. 12 depicts GUI 1201 in which teller 121 has entered information as retrieved from customer 131. For example, customer 131 may provide his/her driver's license so that teller 121 can enter information into GUI 1201. Teller 121 may then "Save Entries" or save the information entered into GUI 1201.

Figure 13:
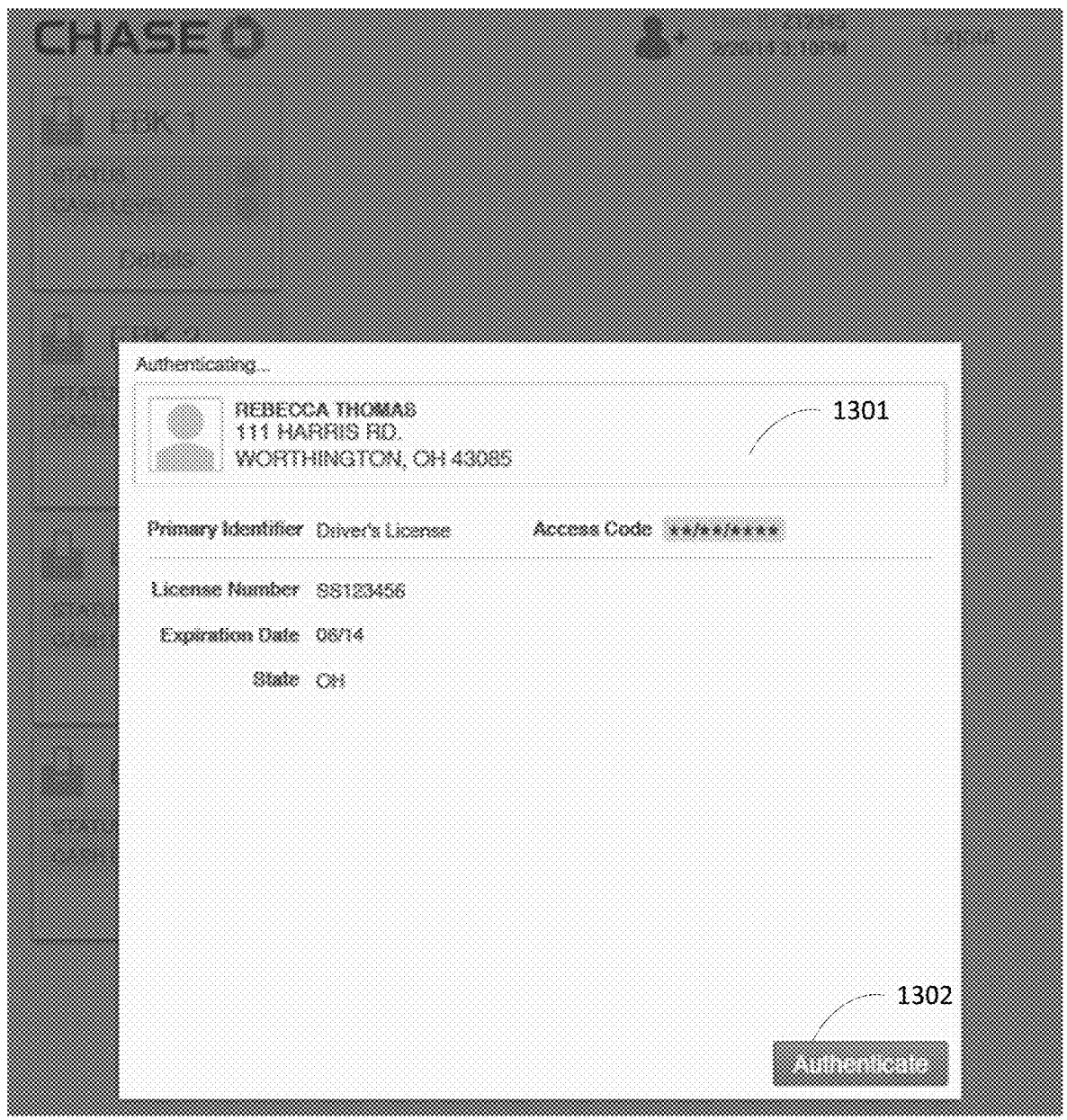

FIG. 13 depicts GUI 1301 in which teller 121 has saved the information entered in GUI 1201 or GUI 1101. The access code may be hidden to prevent teller 121 from learning the customer's temporary access code. After entering and saving the entries, for example, teller 121 may select "Authenticate" 1302 to send the information to server 140 for purposes of authenticating customer 131 based on the entered information. Thereafter, tablet 120 may send the entered information to server 140, and server 140 may compare the received information to information recorded in database 150 for customer 131. If the information matches, then customer 131 may be authenticated, as explained above. If the information does not match, then an error may be displayed on tablet 120, such as on GUI 1301.

Figure 14:
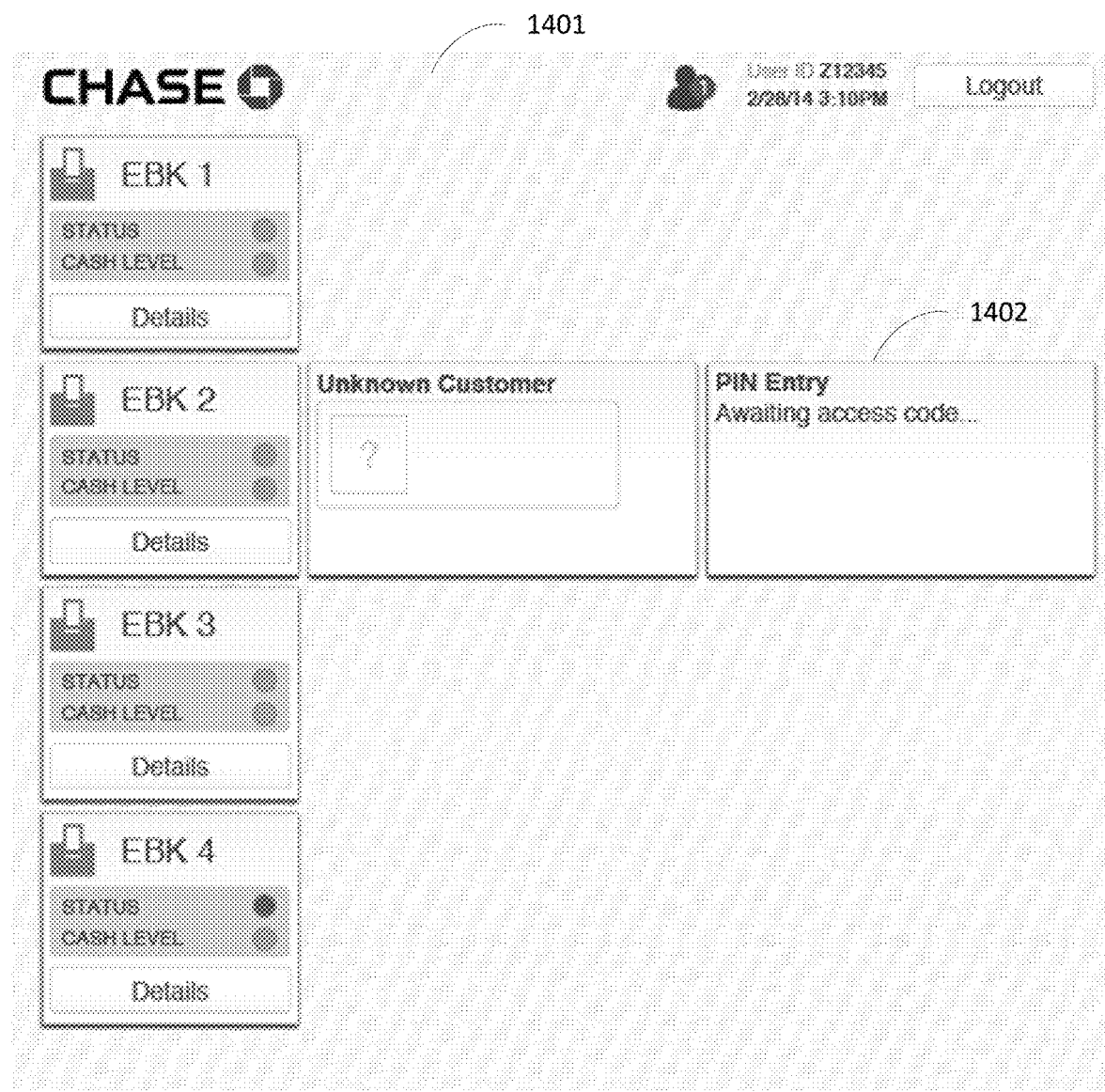

FIG. 14 depicts GUI 1401 which may be displayed after customer 131 has been authenticated. GUI 1401 may display a box 1402 indicating that the system 100 is awaiting entry of the access code from customer 131 at EBK 110, for example. As the code may be a temporary code, box 1402 in GUI 1401 may only be displayed temporarily. If the predetermined amount of time has expired before customer 131 has entered the correct access code, box 1402 may state, "Access Code Expired," for example. Assuming customer 131 has entered the correct code within the predetermined amount of time, GUI 1501 may be displayed.

Figure 15:
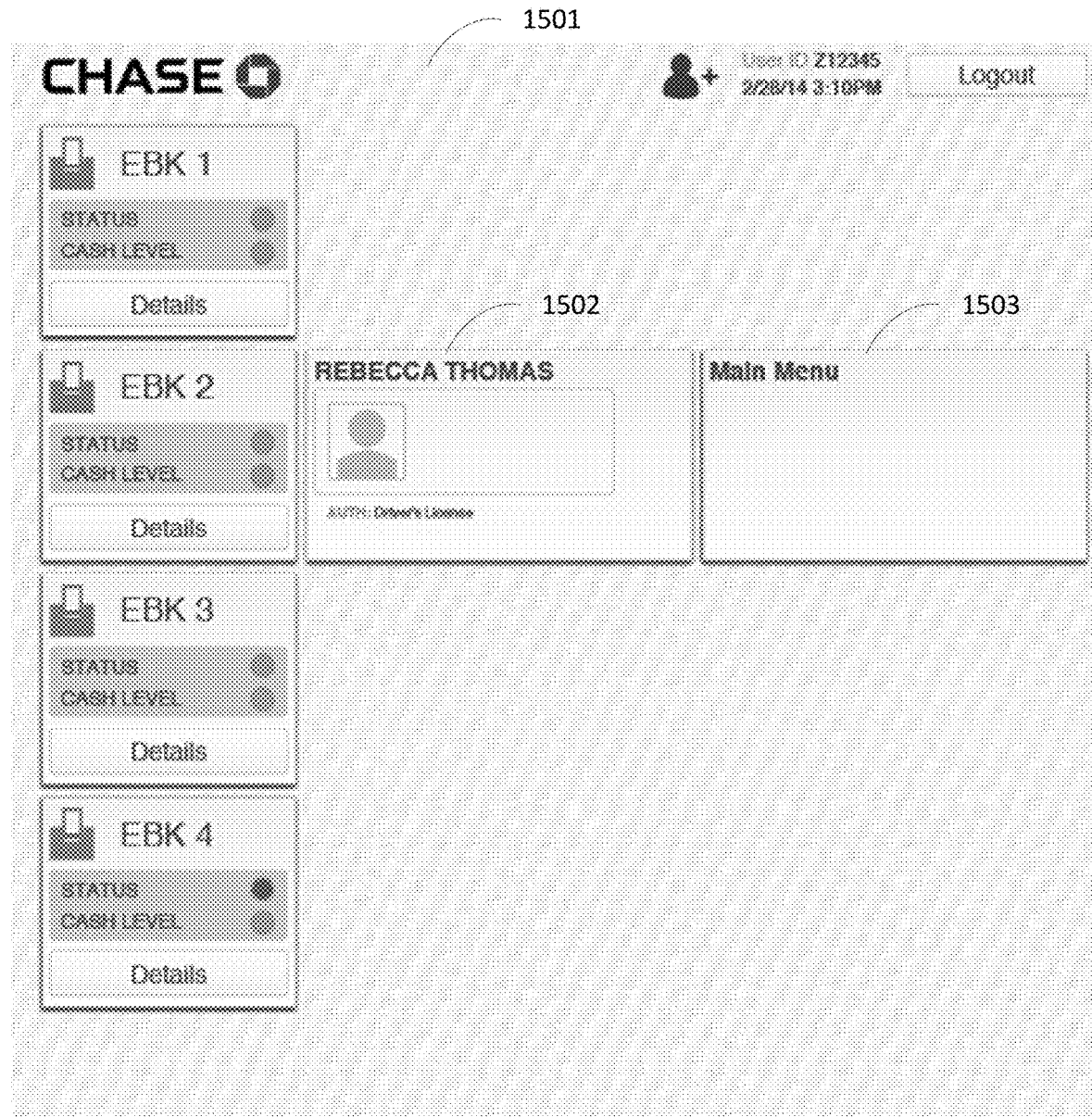

FIG. 15 depicts GUI 1501 which may be displayed after customer 131 has entered the correct code. The code may be required to be entered at a particular EBK (e.g., EBK 2 in FIG. 15 or EBK 110 in FIG. 1). Box 1502 may be displayed to indicate the customer 131 that is currently logged in at EBK 2, for example. Box 1503 may be displayed to indicate which menu or account that customer 131 is currently viewing or accessing at EBK 2, for example.

The GUIs in FIGS. 6-15 are intended to be exemplary only and other information as described above may be displayed on the GUIs or entered into the GUIs.

Hereinafter, physical aspects of implementation of the exemplary embodiments will be described. As described above, exemplary methods may be computer implemented as a system. The system or portions of the system may be in the form of a "processing machine," for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The description of exemplary embodiments describes servers, portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (e.g., servers) instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, portable electronic devices, client devices, computers, etc.)

separately. The functions described as being performed at various components may be performed at other components, and the various components may be combined and/or separated. Other modifications also may be made.

According to exemplary embodiments, the systems and methods may be computer implemented using one or more computers, incorporating computer processors. The computer implementation may include a combination of software and hardware. The computers may communicate over a computer based network. The computers may have software installed thereon configured to execute the methods of the exemplary embodiments. The software may be in the form of modules designed to cause a computer processor to execute specific tasks. The computers may be configured with hardware to execute specific tasks. As should be appreciated, a variety of computer based configurations are possible.

The processing machine described above may also utilize any of a wide variety of other technologies including a special purpose computer, a computer system including a microcomputer, mini-computer or mainframe for example, a programmed microprocessor, a micro-controller, a PICE (peripheral integrated circuit element), a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices for example capable of implementing the steps of the process.

It is appreciated that in order to practice the methods as described above, it is not necessary that the processors and/or the memories of the processing machine be physically located in the same geographical place. For example, each of the processors and the memories and the data stores used may be located in geographically distinct locations and connected so as to communicate in any suitable manner. Additionally, it is appreciated that each of the processor and/or the memory and/or data stores may be composed of different physical pieces of equipment. Accordingly, it is not necessary that the processor be one single piece of equipment in one location and that the memory be another single piece of equipment in another location. For example, it is contemplated that the processor may be two or more pieces of equipment in two or more different physical locations. These two or more distinct pieces of equipment may be connected in any suitable manner. Additionally, the memory may include two or more portions of memory in two or more physical locations. Additionally, the data storage may include two or more components or two or more portions of memory in two or more physical locations.

To explain further, processing as described above is performed by various components and various memories. However, it is appreciated that the processing performed by two distinct components as described above may, in accordance with further embodiments, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions. It is also appreciated that the data storage performed by two distinct components as described above may, in accordance with a further embodiment, be performed by a single component. Further, the data storage performed by one distinct component as described above may be performed by two distinct components.

Further, various technologies may be used to provide communication between the various processors and/or memories, as well as to allow the processors and/or the memories of the various embodiments to communicate with any other entity; e.g., so as to obtain further instructions or to access and use remote memory stores, for example. Such technologies used to provide such communication might include a network, such as a computer network, for example, the Internet, Intranet, Extranet, LAN, or any client server system that provides communication of any capacity or bandwidth, for example. Such communications technologies may use any suitable protocol such as TCP/IP, UDP, or OSI, for example. It should be appreciated that examples of computer networks used in the preceding description of exemplary embodiments, such as the Internet, are meant to be non-limiting and exemplary in nature.

As described above, a set of instructions is used in the processing of various embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming or any other suitable programming form. The software tells the processing machine what to do with the data being processed.

Further, it is appreciated that the instructions or set of instructions used in the implementation and operation of the various embodiments may be in a suitable form such that the processing machine may read the instructions. For example, the instructions that form a program may be in the form of a suitable programming language, which is converted to machine language or object code to allow the processor or processors to read the instructions. For example, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments. Illustratively, the programming language used may include assembly language, ActionScript, Ada, APL, Basic, C, C++, C#, COBOL, Ceylon, Dart, dBase, F#, Fantom, Forth, Fortran, Go, Java, Jquery, Modula-2, .NET, Objective C, Opa, Pascal, Prolog, Python, REXX, Ruby, Visual Basic, X10, and/or JavaScript, for example. Further, it is not necessary that a single type of instructions or single programming language be utilized in conjunction with the operation of the system and method of various embodiments. Rather, any number of different programming languages may be utilized as is necessary or desirable.

Also, the instructions and/or data used in the practice of the various embodiments may utilize any compression or encryption technique or algorithm, as may be desired. An encryption module might be used to encrypt data. Further, files or other data may be decrypted using a suitable decryption module, for example.

As described above, various embodiments may illustratively be embodied in the form of a processing machine, including a computer or computer system, for example, that includes at least one memory. It is to be appreciated that the set of instructions, e.g., the software for example, that enables the computer operating system to perform the operations described above may be contained on any of a wide variety of computer readable media, as desired. Further, the data for example processed by the set of instructions might also be contained on any of a wide variety of media or medium. For example, the particular medium, e.g., the memory in the processing machine, utilized to hold the set of instructions and/or the data used may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the system.

Further, the memory or memories used in the processing machine that implements the various embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the various embodiments, a variety of "user interfaces" may be utilized to allow a user to interface with the processing machine or machines that are used to implement the embodiment. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is contemplated that the user interface might interact, e.g., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

While the embodiments have been particularly shown and described within the framework of financial services devices, such as EBKs, it will be appreciated that variations and modifications may be effected by a person of ordinary skill in the art without departing from the scope of the invention. Furthermore, one of ordinary skill in the art will recognize that such processes and systems do not need to be restricted to the specific embodiments described herein. Other embodiments, combinations of the present embodiments, and uses and advantages will be apparent to those skilled in the art from consideration of the specification and practice of the embodiments disclosed herein. The specification and examples should be considered exemplary.

What is claimed is:

1. A computer-implemented method for providing authenticated cardless access to a financial transaction machine, the method comprising:
    establishing a secure connection between a mobile computing device, operated by a teller, and an account server storing at least one financial account profile associated with a user, wherein the mobile computing device operated by the teller is authenticated with the account server;
    transmitting, by the mobile computing device, identification information provided by the user, across the secure connection to the account server, to thereby identify at least one account profile associated with the user, wherein the customer identification information is entered into the mobile computing device by the teller;
    authenticating the user, at a financial transaction machine identified by the account server, by:
        generating a random code, by the account server, and transmitting it along with the at least one account profile, to the identified financial transaction machine, wherein the random code and the at least one account profile, are temporarily stored on the identified financial transaction machine;
        transmitting the random code generated by the account server, directly to a mobile communication device associated with the user;
        providing the random code from the mobile communication device to the identified financial transaction machine for validation against the random code temporarily stored on the identified financial transaction machine; and
        providing the user with authenticated access to the at least one account profile at the identified financial transaction machine, upon determining a match, by a processor of the identified financial transaction machine, between the random code provided by the mobile communication device and the random code temporality stored on the identified financial transaction machine, thereby enabling the user to conduct cardless financial transactions by using the identified financial transaction machine.

2. The method of claim 1, further comprising:
    receiving, at the identified financial transaction machine, an inputted code corresponding to the random code transmitted to the mobile communication device associated with the user;
    validating the inputted code by comparing the inputted code to a sent code corresponding to the random code transmitted to the identified financial transaction machine; and
    presenting, at the identified financial transaction machine, the account profile to the user.

3. The method of claim 1, wherein the random code is a randomly generated alpha-numeric code.

4. The method of claim 1, wherein the random code has an expiration time.

5. The method of claim 1, wherein the at least one account profile associated with the user comprises user account information for accounts of the user that are linked to a physical form of authentication.

6. The method of claim 1, wherein the identification information provided by the user comprises all or a portion of at least one of a driver's license number, a social security number, a government-issued identification (ID) number, a bank-issued number, a Personal Identification Number (PIN), and a name of the user.

7. The method of claim 1, wherein the mobile computing device operated by the teller is authenticated with the account server using one or more biometric information associated with the teller, wherein the one or more biometric information is outputted from a wearable device on the teller.

* * * * *